United States Patent
Vanstone et al.

(10) Patent No.: US 6,430,690 B1
(45) Date of Patent: Aug. 6, 2002

(54) SECURE ONE-WAY AUTHENTICATION COMMUNICATION SYSTEM

(75) Inventors: Scott A. Vanstone, Campbellville; Ashok V. Vadekar, Rockwood; Robert J. Lambert, Cambridge; Robert P. Gallant, Mississauga, all of (CA)

(73) Assignee: Certicom Corp., Ontario (CA)

( * ) Notice: Subject to any disclaimer, the term of this patent is extended or adjusted under 35 U.S.C. 154(b) by 79 days.

(21) Appl. No.: 09/628,045

(22) Filed: Jul. 28, 2000

Related U.S. Application Data

(63) Continuation of application No. PCT/CA99/00053, filed on Feb. 1, 1999.

(30) Foreign Application Priority Data

Jan. 30, 1998 (GB) .............................................. 9802152

(51) Int. Cl.$^7$ ................................................. G06F 1/24
(52) U.S. Cl. ........................ 713/182; 713/171; 713/161; 713/168
(58) Field of Search ................................. 713/161, 168, 713/169, 170, 171, 182

(56) References Cited

FOREIGN PATENT DOCUMENTS

EP 0535863 4/1993 ............. H04L/9/08

OTHER PUBLICATIONS

"Limitations of Challenge—Response Entity Authentication" Electronics Letters (Stevenage GB), vol. 25, No. 17, Aug. 17, 1989 p. 1195/1196 XP000054010.

*Primary Examiner*—Thomas R. Peeso
(74) *Attorney, Agent, or Firm*—Finnegan, Henderson, Farabow, Garrett, & Dunner L.L.P.

(57) ABSTRACT

A protocol for authenticating at least one of a pair of first and second correspondents C and T in a data communication system, the method comprising the steps or storing a public key in the first correspondent C; computing a shared secret by the second correspondent T incorporating the public key C; storing the shared secret in the first correspondent C: the second correspondent T generating a challenge value a; the first correspondent C transmitting to the second correspondent T information including the stored public key C; the second correspondent T computing a test shared secret from the received public key C; the first and second correspondents computing response signals using the challenge value z and the shared secret in a one-way function fr; and the first correspondent C transmitting the computed response signal to the second correspondent T whereby the second correspondent verifies the first correspondent.

12 Claims, 2 Drawing Sheets

SECURE ONE-WAY AUTHENTICATION COMMUNICATION SYSTEM

This application is a continuation of International Application No. PCT/CA99/00053, filed Feb. 1, 1999, the content of which is incorporated herein by reference.

This invention relates to a protocol for the secure verification of correspondents in a data communication system and in particular to the verification of at least one of the correspondents having limited computing power.

BACKGROUND OF THE INVENTION

Traditionally, a mechanical turnstile system was used to restrict the entry of persons into or out of a pre-determined area. In order to gain entry, the user is required to pay a fee, the fee being in the form of cash, tokens, fee cards or other payment medium. These mechanical turnstiles however allow entry without being able to identify the persons entering or leaving. In order to monitor users, an operator is required.

In order to alleviate this problem electronic card entry and exit systems were devised. In these types of systems, a user is issued with an identification card beforehand which is then inserted into a card reader and upon positive verification will allow entry via a locked door or similar barrier thus obviating the need for an operator. A disadvantage of this system is that for a large number of users, a database has to be maintained listing each of the users, particularly if each user has a unique identification then the verification system is required to scroll through each of the records to find a matching identity. Secondly, this system is also inconvenient if there are a large number of users entering a particular location at a given time such as a public transit way, the insertion and withdrawal of cards from a card reader is apt to cause bottlenecks at the entrance way.

Transit systems have been devised in which users are provided with a pre-programmed smart card. In this system, the turnstile or a terminal is able to monitor the smart card remotely thus the user simply walks past the turnstile without having to physically insert the card in a slot. The card is generally activated by the presence of a electromagnetic field generated by the terminal, the card then transmits an appropriate identification back to the terminal which verifies the card identification and allows entry of the user. These cards generally have limited computing power and are not able to perform complex computations. It is also desirable to authenticate these cards to prevent duplication or fraudulent entry. Because the cards have limited computing power, it is necessary to implement a authentication protocol that minimizes the computation performed by the card and furthermore is able to provide verification of the card by the terminal in a very short period of time, generally less than one second.

SUMMARY OF THE INVENTION

This invention seeks to provide a solution to the problem of card verification between a terminal and a card where the card device has limited computing power.

According to one aspect of this invention there is provided a method of authenticating at least one of a pair of correspondents T and C in an information exchange session, and wherein one of the correspondents T includes a secret key t and the other correspondent C has a public key C and a shared secret value $t_C$ derived from said public key C and said secret key t the method comprising the steps of:

the first correspondent C transmitting to the second correspondent T said public key C;

the second correspondent T generating a challenge value $\chi$ and transmitting said challenge value $\chi$ to said first correspondent C;

said second correspondent T generating a session shared secret value ss by combing said private key t with said public key C of said first correspondent C;

said second correspondent T generating a response test value $k_t$ by combining said session shared secret ss with said challenge $\chi$, in a mathematical function $f_1$;

said first correspondent C generating a response value $k_c$ by combining said shared secret $t_C$ with said challenge value $\chi$ in said mathematical function $f_1$ and sending said response value $k_c$ to said second correspondent T; and said second correspondent T comparing said response test value $k_t$ to said challenge response value $k_c$ to verify said first correspondent C.

A further aspect of this invention provides for said public key C being included in a certificate $Cert_C$, whereby the second correspondent verifies the certificate on C and the identity of the first correspondent C before generating the challenge $\chi$.

In accordance with a further aspect of this invention the mathematical function $f_1$ is a one way function.

BRIEF DESCRIPTION OF THE DRAWINGS

Embodiments of the present invention will now be described by way of example only with reference to the accompanying drawings in which.

DETAILED DESCRIPTION OF PREFERRED EMBODIMENTS

Figure 1:
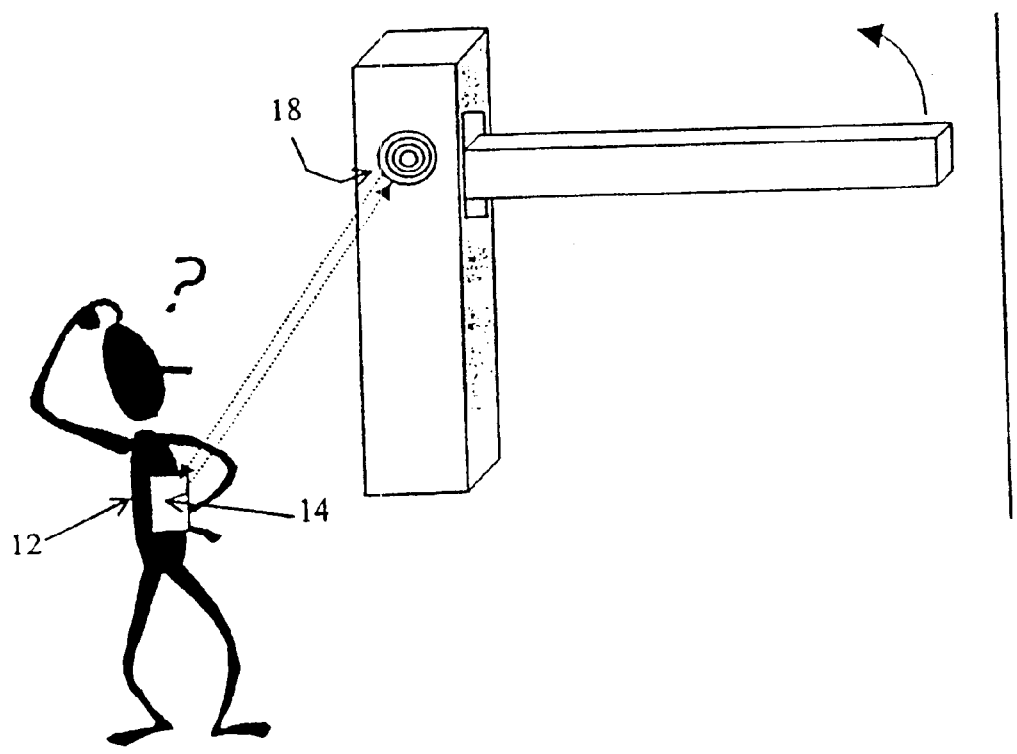
FIG. 1 is a schematic representation of a communication system.

In the following description like numerals referred to like elements. Referring to FIG. 1, a transit control system is shown generally by numeral 10. In the system, a user 12 carries an identification card 14. A terminal including a card reader is provided for remote monitoring of card carrying users 12. The terminal 16 communicates with cards in a given area of proximity via, for example, electromagnetic means 18. These systems are readily available and will not be discussed further.

In the context of the present data communication system, the card and terminal are designated a pair of first and second correspondents C and T respectively. Depending upon the reading mechanism employed, the card generally is powered when brought in proximity to the magnetic field generated by the terminal 18. The card 14 contains a low power processing unit which is at least capable of performing simple calculations. In a typical data communication session, the card assembles a data string, which when assembled is transmitted to the terminal.

At system set-up, i.e. when a card is issued to a user, an encryption scheme is chosen and appropriate system parameters are defined. In the following example an elliptic curve encryption scheme is used. The details of encryption schemes will not be discussed as they are well known in the art. However, if the elliptic curve encryption system is being utilized, then a public value C=cP, is computed where P is a generator point on the elliptic curve. The public value C is signed by a certifying authority (CA) to produce a certificate $Cert_c$, containing the public key C and identification of the card C and stored in the card 14. A shared secret $t_C=tC$ is calculated where t is a secret key known to the terminal T. This shared secret $t_C$ is stored in the card within a secure boundary. Thus after the system set-up phase, the card contains a certificate $Cert_C$ and a shared secret $t_C$.

Figure 2:
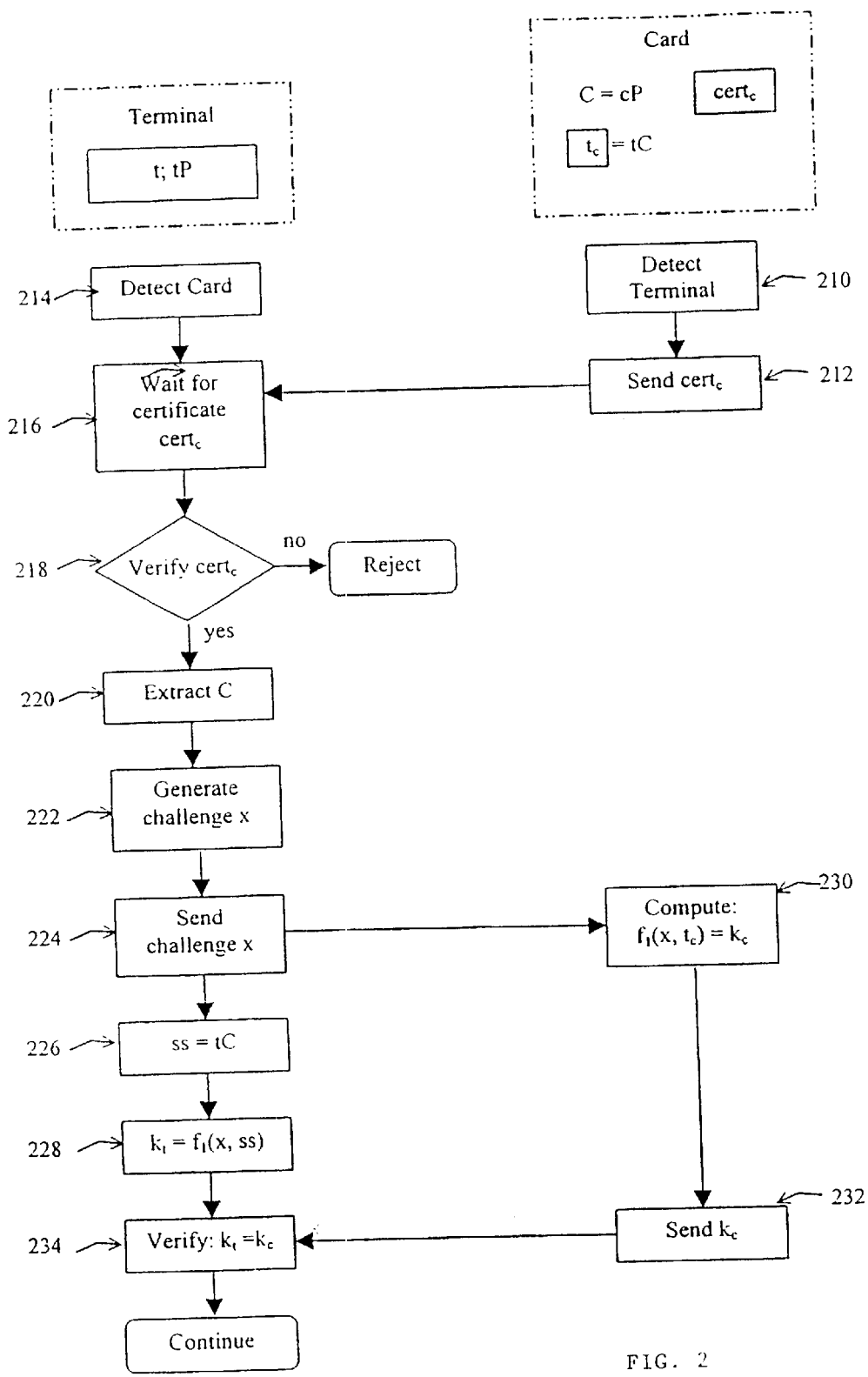
FIG. 2 is a flow chart showing a verification protocol according to the present invention.

Referring now to FIG. 2, a protocol according to an embodiment of the present invention is shown generally by numeral 200. When the user 12 carrying the card 14 is in proximity to the terminal 18, the card detects the terminal 210 and sends its certificate $Cert_c$ to the terminal T. Similarly when the terminal detects the card 214 it waits for a certificate $Cert_c$ 216. When the terminal receives the certificate, it verifies the certificate using the CA's public key 218. If the certificate is not verified, a rejection signal is generated which may be used to alert or signal an appropriate barrier or event. However if the certificate is verified the terminal extracts the public key C of the card from the certificate 220. The terminal then generates a challenge $\chi$ 222, which may be a large integer, or any suitable bit string. This challenge $\chi$ is then sent to the card 224. At the same time the terminal computes a shared secret ss=tC and computes a challenge response verification value $k_T=f_1(\chi, ss)$, where $f_1$ is a one-way function such as a secure hash function or one derived from the data encryption standard (DES). The card upon receipt of the challenge $\chi$ also computes its challenge response $k_c$ by applying a one-way function $f_1$ to the challenge value $\chi$ and the shared secret $t_C$ to calculate $k_c=f_1(\chi, t_C)$. This challenge response value $k_c$ is then sent back to the terminal 232 where it is verified 234 by the terminal comparing $k_t$ to $k_c$. If these values are equal then the card is verified.

It may be seen thus that the purpose of the challenge $\chi$ is to know that the card has the shared secret $t_C$, otherwise the data communication system is open to replay attack, where an observer watches for the $k_c$ and may send it back at a later time. Furthermore it may be seen from the system that the terminal does not have to maintain a record of secret keys for each card authorized in the system. The advantage of this may well be appreciated when for example the card is a public rail transit card identification and the terminal has to maintain records for each of approximately a few hundred thousand users. Thus the present invention avoids this disadvantage.

In a further embodiment, the card may at step 230 in producing the challenge response compute a value $k_{sig}=f_1(\chi, t_c, m)$ where m is a message to be signed by the card. The card may then concatenate the challenge response $k_{sig}$ with the message and sends this to the terminal. In this instance, the card is both authenticated and a message generated by the card is signed.

In a still further embodiment, the card may be authenticated as well as send an encrypted message. In this instance, the card calculates its challenge response value $k_{enc}=f_1(\chi, ss)$ and using this value as a key to calculate an encrypted value of a message m using for example a DES or DESX such that $E=E_{Kenc}(m)$. In this instance the card is implicitly authenticated with the encrypted message. This may be useful for example when the card sends a P.I.N. back to the terminal.

In a further embodiment, the system rather than utilizing a single value of t, may use many values of t, i.e. $t_i$ thus producing many shared secrets $ss(t_i)$. In this instance, the card will send with its certificate the index i so that the terminal may extract the appropriate $t_i$ to compute its shared secret as shown in step 226 FIG. 2.

In the above examples, the shared secret $ss=t_C$ was for an elliptic curve implementation. For a finite field implementation, the shared secret may be calculated as $ss=C^T$. Furthermore a more generalized form of the shared secret is a function combining the values of the terminals private key t and the cards public key C using a cryptographic function $f_1(t, C)$.

While the invention has been described in connection with the specific embodiment thereof, and in a specific use various modifications thereof will occur to those skilled in the art without departing from the spirit of the invention as set forth in the appended claims. In general, this invention has application to situations where authenticated access to goods and services are required or where entry is to be controlled.

The terms and expressions which have been employed in this specification are used as terms of description and not of limitations, there is no intention in the use of such terms and expressions to exclude any equivalence of the features shown and described or portions thereof, but it is recognized that various modifications are possible within the scope of the claims to the invention.

We claim:

1. A method of authenticating at least one of a pair of first and second correspondents C and T in a data communication system, said method comprising the steps of:

storing a public key in said first correspondent C;

computing a shared secret by said second correspondent T incorporating said public key C;

storing said shared secret in said first correspondent C;

said second correspondent T generating a challenge value $\chi$ and transmitting said challenge signal $\chi$ to said first correspondent C;

said first correspondent C transmitting to the second correspondent T information including said stored public key C;

said second correspondent T computing a test shared secret from said received public key C;

said first and second correspondents computing response signals using said challenge value $\chi$ and said shared secret in a one-way function $f_1$; and said first correspondent C transmitting said computed response signal to said second correspondent T whereby said second correspondent may verify said first correspondent.

2. A method as defined in claim 1, including said first correspondent C transmitting a signed message m with said response.

3. A method as defined in claim 2, including signing said message with said one way function.

4. A method as defined in claim 3, said signed message being included with said computed response and concatenated with said message for transmission.

5. A method as defined in claim 1, including said first correspondent C encrypting a message m in accordance with a symmetric key scheme, wherein said symmetric key is derived from said computed response value and transmitting said encrypted message to said second correspondent T.

6. A method as defined in claim 5, said signature scheme is an RSA type signature scheme.

7. A method as defined in claim 1, said shared secret being computed by said second correspondent T by utilizing its secret key and the public key C.

8. A method as defined in claim 1, said second correspondent T having a plurality of private keys $t_i$ corresponding to respective first correspondents;

receiving from said first correspondent C an identification index i; and using said corresponding private key $t_i$ and the public key C to compute a shared secret $ss_i$.

9. A method as defined in claim 1, said public key scheme being an elliptic curve scheme.

10. A method as defined in claim 1, said public key scheme being an RSA type scheme.

11. A method of authenticating at least one of a pair of correspondents T and C in an information exchange session, and wherein one of the correspondents T includes a secret key t and the other correspondent C has a public key C and a shared secret value $t_C$ derived from said public key C and said secret key t, the method comprising the steps of:

the first correspondent C transmitting to the second correspondent T information including said public key C;

the second correspondent T generating a challenge signal $\chi$ and transmitting said challenge signal $\chi$ to said first correspondent C;

said second correspondent T generating a session shared secret ss by combining said private key t with said public key C of said first correspondent C;

said second correspondent T generating a response signal $k_t$ by combining said session shared secret ss with said challenge signal $\chi$, in a mathematical function $f_1$;

said first correspondent C generating a response value $k_c$ by combining said shared secret $t_C$ with said challenge value $\chi$ in said mathematical function $f_1$ and sending said response value $k_c$ to said second correspondent T; and said second correspondent T comparing said response test value $k_1$ to said challenge response value $k_c$ to verify said first correspondent C.

12. An article of manufacture comprising:

a computer usable medium having computer readable program code embodied therein for authenticating at least one of a pair of correspondents T and C in an information exchange session, and wherein one of the correspondents T includes a secret key t and the other correspondent C has a public key C and a shared secret value $t_C$ derived from said public key C and said secret key t, the computer readable program code in said article of manufacture comprising;

computer readable program code configured to cause a computer to generate a challenge signal $\chi$ and transmit said challenge signal $\chi$ to said first correspondent C in response to a received public information from said first correspondent;

computer readable program code configured to cause a computer to generate a session shared secret ss by combining said private key t with said public key C of said first correspondent C;

computer readable program code configured to cause a computer to generate a test response signal $k_t$ by combining said session shared secret ss with said challenge signal $\chi$, in a mathematical function $f_1$;

computer readable program code configured to cause a computer to compare said response test signal $k_t$ to a received response value $k_c$ from said first correspondent to verify said first correspondent C.

* * * * *